July 10, 1951  J. DI PALMA  2,560,418
SPLIT CABLE GRIP
Filed Dec. 10, 1949  2 Sheets-Sheet 1
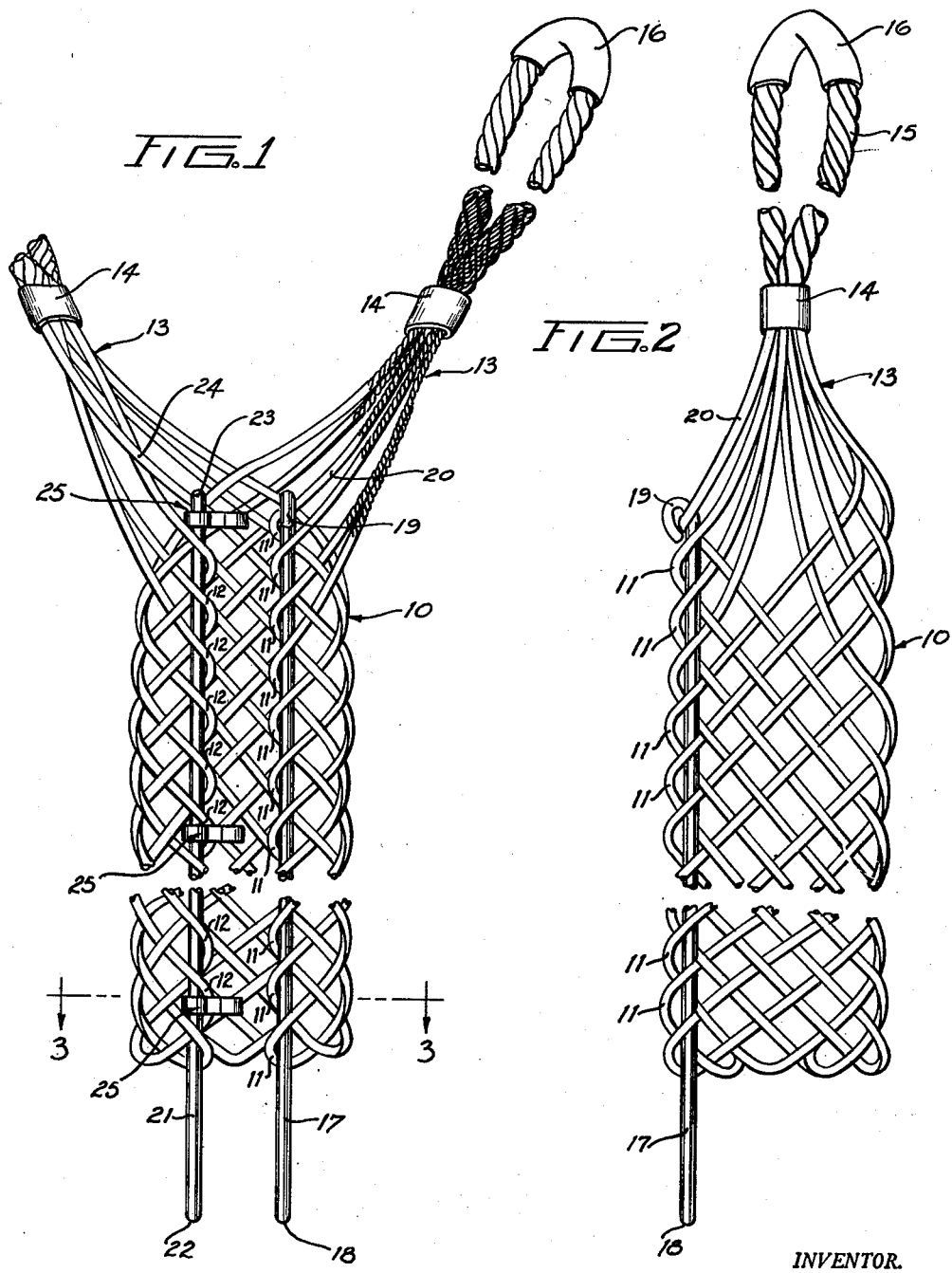
INVENTOR.
JOSEPH DI PALMA
BY
ATTORNEY July 10, 1951  J. DI PALMA  2,560,418
SPLIT CABLE GRIP
Filed Dec. 10, 1949  2 Sheets-Sheet 2
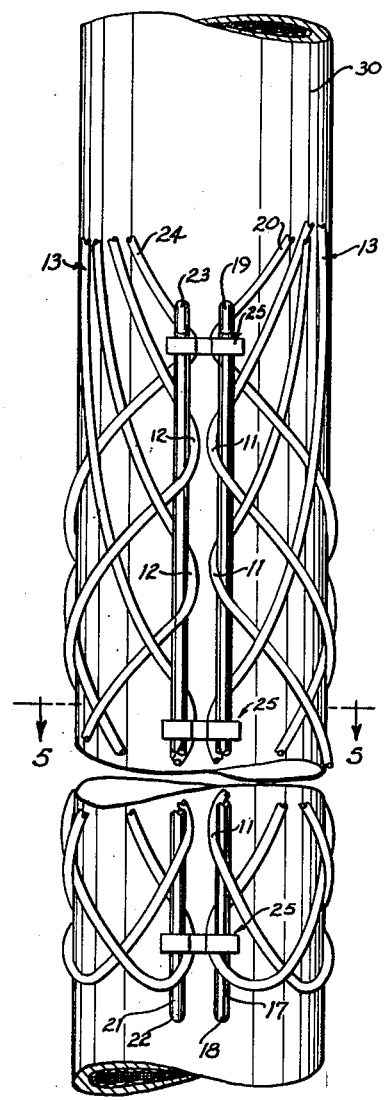
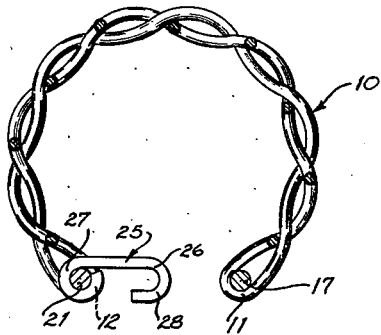
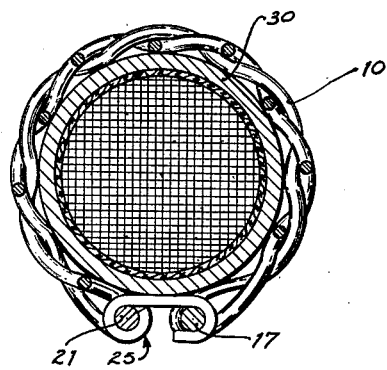
INVENTOR.
JOSEPH DI PALMA
BY
ATTORNEY Patented July 10, 1951

2,560,418

UNITED STATES PATENT OFFICE 2,560,418

SPLIT CABLE GRIP

Joseph Di Palma, Westport, Fairfield County, Conn., assignor to Dominick Di Palma, Brooklyn, N. Y.

Application December 10, 1949, Serial No. 132,277

12 Claims. (Cl. 24—123)

This invention relates to open-mesh woven wire tubes, known in the art as cable-grips, adapted to be expanded and contracted by endwise compression and extension respectively, and is directed more particularly to a specific type of cable-grip which is woven in the form of a split tube, each of the adjacent edges of the "split" constituting a series of loops, and novel means for securing the same in embracing relation with a cable or the like. Such cable-grips are termed "split cable-grips."

Split cable-grips are particularly useful for supporting, or providing additional support for cables, particularly in tall structures. For example consider a cable installed in a shaft of a tall building and having branches extending therefrom to each floor, and it is found that the weight of the cable imposes too great a load upon said branches. The remedy is to use cable-grips to support the cable and take the load off of the branches. Obviously a regular tubular cable-grip cannot be used, because it would have to be slipped along the cable endwise to the point where it is to be used, and this is impossible because of the branches.

A split cable-grip can be applied to such cables because it can be placed in embracing relation with the cable at practically any desired position. However split cable-grips of the prior art are usually "laced" together after being so placed. This is usually done by taking a piece of the same braided wire of which the grip was woven, and this wire is passed through the adjacent loops bordering the split much in the same manner as is usual in lacing a shoe. This "lacing operation" required a great deal of care and patience and the end result varied with (1) the workman, (2) the location of the split grip, and (3) the time allotted to the workman to complete the lacing.

According to the present invention I form a split cable grip in the usual manner, then I provide a pair of rods, one of which is passed through the loops bordering one edge of the split, and the other of which is passed through the loops bordering the other edge of the strip. One of these rods is provided with spaced hooks or other suitable fastening means, adapted to be hooked onto the other of said rods. One end of each rod is secured to the cable grips, and the other ends of each rod is free and extends substantially beyond the other end of the cable grip to allow the grip to be expanded and contracted.

The principal object of the invention is the provision of a split cable grip carrying cooperative elements by means of which it may be quickly placed in embracing relation with and/or quickly removed from a cable or the like. These cooperative elements form integral parts of the cable grip and consequently there are no detachable parts to become mislaid or lost.

Other objects and advantages of the invention will become apparent to those skilled in the art upon a study of this specification and the accompanying drawings.

Referring to the drawings which are given by way of example to illustrate the invention:

Figure 1 is a front elevation of a split cable grip made according to the invention and showing the cooperative elements disengaged;

Figure 2 is a side elevational view of the cable grip shown in Figure 1;

Figure 3 is a sectional view taken along the lines 3—3 of Figure 1;

Figure 4 is a front elevation showing the cable grip of Figure 1 applied to a cable and showing the cooperative elements engaged; and Figure 5 is a sectional view taken along the lines 5—5 of Figure 4.

Referring first to Figures 1, 2, and 3, the split cable grip 10 is woven in the same manner as is customary in the art, with a series of loops 11 forming one border of the split, and with a series of loops 12 forming the other border. The cable grip has the usual end loops on one end thereof, and the strands or branches 13 extend, for example, in two groups. These branches, near the tube are bound together by means of tubular metallic ferrules 14, and beyond the ferrule, each group is formed into a loop 15, the apex of which carries a draft head 16.

A rod 17 which has its lower end 18 rounded and which has an "eye" 19 formed on its other end is passed through all of the loops 11, and the eye 19 is closed about the strand 20 leading from the uppermost loop 11, as seen in Figures 1 and 2, thereby permanently associating the rod 17 with the loops 11. It will be noted that the rod 17 is substantially longer than the woven body 10 and it is "free" throughout its length from the eye 19 downwardly, thereby permitting the woven body 10 to be freely expanded and contracted.

A second rod 21, is identical with the rod 17, and has its lower end 22 rounded and has an eye 23 on its upper end. This rod is passed through the loops 12 in the same manner as the rod 17 was passed through the loops 11, with one exception: at spaced intervals the rod 21 is also passed through the closed loop 27 of a hook member 25, which may best be seen in Figure 3. This hook member is comprised of a body 26 having a closed loop 27 on one end and an open hook forming the other end, and is formed of steel of the proper tensile strength to stand the load imposed on it.

These hook members 25 are preferably spaced equally along the rod 21, and the spacing depends upon the diameter of the cable to be supported. After the rod 21 is passed through all of the loops 12 and the required number of hook members, the eye 23 thereon is closed about the strand 24 leading from the uppermost loop 12. Thus the cable grip, the rods, and the hook members form a unitary structure without any loose or detachable parts to be mislaid or lost.

*Application of the grip to a cable*

The worker takes the cable grip as shown in Figures 1 and 2 and presses both ends toward each other, thereby expanding or increasing the diameter of the woven body 10, then with the hook members 25 turned outwardly, he places the body 10 about the cable 30, for example. Since the rods 17 and 21 are rigid, he may grasp them to facilitate the operation, and after the body is about the cable the worker urges the rods toward each other and when they are near enough he hooks the open hooks 28 on to the rod 17. Then he elongates the woven body 10, thereby contracting the woven body 10. As the body contracts the hooks 28 firmly engage the rod 17, as shown in Figures 4 and 5, and when the grip is subjected to the load the grip functions in the usual manner.

Although the invention is described above in connection with a constant mesh split cable grip, it is equally applicable to split cable grips of the variable mesh type, or to split cable grips embodying combinations of constant and variable mesh.

It will also be understood the split tubular grip may be woven in split tubular form to have a C cross-section, or it may be woven in the form of a flat rectangular body, having branch wires extending from one end thereof and having each lateral edge formed of a series of loops. The rods, such as the rods 17 and 21 extend through or traverse the loops of the two series, and one rod carries the spaced hook members and the latter are engaged with the other rod in the manner described above, after the body is placed about the cable.

I have found by comparative tests that the herein described split cable grip may be applied to a cable many times faster than any other split cable grip on the market, and with substantial uniformity.

Although I have herein shown and described one embodiment of the invention, it will be understood that I am not limited to the details of the embodiment shown, as many changes may be made in the arrangements shown and described within the scope of the following claims.

I claim:

1. In a split cable grip having a series of loops bordering one edge of the split and a second series of loops bordering the other edge of the split, elongated means traversing the loops in one series, a second elongated means traversing the loops in said second series, and securing means carried by one of said elongated means and adapted to engage the other.

2. In a split cable grip having a series of loops bordering one edge of the split and a second series of loops bordering the other end of the split, elongated means carried by said cable grip and freely traversing the loops of said first series, a second elongated means also carried by said cable grip and freely traversing the loops of said second series, and a series of spaced engaging members carried by one of said elongated means and adapted to be manually engaged with the other of said elongated means.

3. In a split cable grip having a series of loops defining one edge of the split and having a second series of loops defining the opposite edge of the split, a rigid elongated member traversing the loops of said first series, a second rigid elongated member traversing the loops of said second series, and a series of spaced engaging members movably mounted on one of said rigid members and adapted to be manually moved into engagement with the other of said rigid members.

4. In a split cable grip having a series of loops defining one edge of the split and having a second series of loops defining the opposite edge of the split, the loops in one series being substantially parallel to the loops in the other series, a rod freely extending through the loops of one of said series and having one end thereof secured to said grip, a second rod freely extending through the loops of the other series and having one end thereof secured to said grip, and a series of engaging members journaled on one of said rods in spaced relation to each other, each of said members having a hook shaped end adapted to be manually moved into engagement with the other of said rods.

5. In a gripping device, a plurality of wire strands interwoven to form an open mesh body adapted to be placed in embracing relation with a cable or other such object to be supported, each lateral edge of said body terminating in a series of loops, a rod freely traversing the loops along one of said lateral edges, a second rod freely traversing the loops along the other of said lateral edges, and securing means cooperating with said rods for binding said body about said object.

6. In a gripping device, a plurality of wire strands interwoven to form an open mesh rectangular body adapted to be placed about a cable or the like, each lateral edge of said body being in the form of a series of loops, a rod extending through the loops along one lateral edge of said body and having one end thereof secured to one of said strands at one end of said body, a second rod extending through the series of said loops along the other lateral edge of said body and having one end thereof secured to another of said strands, and securing means carried by one of said rods and adapted to be engaged with the other of said rods for binding said body about said cable.

7. In a gripping device, a plurality of wire strands interwoven to form an open mesh body generally rectangular in form and adapted to be placed in surrounding gripping relation with cable or other tubular object, extension strands at one end of said body being divided into groups, one lateral edge of said body being formed of a series of loops, the other lateral edge of said body being formed of a second series of loops, elongated rigid means on said body traversing the loops of said first series, a second elongated rigid means on said body traversing the loops of said second series, and means cooperating with both said rigid means for securing them together in predetermined relation, thereby binding said body about said cable.

8. In a gripping device, a plurality of wire strands interwoven to form an open mesh body generally rectangular in form and adapted to be placed in surrounding gripping relation with cable or other tubular object, extension strands at one end of said body being divided into groups, one lateral edge of said body being formed of a series of loops, the other lateral edge of said body being formed of a second series of loops, a rod traversing the loops of said first series and having one end thereof secured to one of the strands forming said body, a second rod traversing the loops of said second series and having one end thereof secured to one of the strands forming said body and spaced locking means carried on at least one of said rods and adapted to be placed into hooked engagement with the other of said rods, thereby binding said body about said cable.

9. In a gripping device, a plurality of wire strands interwoven to form a split tubular open mesh body adapted to be placed in embracing relation with a cable or the like, said body along one edge of the split being formed of a series of loops, said body along the other edge of said split being formed of a second series of loops, a rod freely traversing the loops in one series, a second rod freely traversing the loops in the other series, and securing means carried at least by one of said rods and cooperating with the other for binding said body about said object.

10. In a split cable grip having a series of loops bordering on each edge of the split, an elongated rod extending through the loops of one series, a second elongated rod extending through the loops of the other series and securing means carried by at least one of said rods for engaging the other and securing them together.

11. A cable grip according to claim 10 in which said securing means is comprised of a series of hooks journalled on one of the rods and adapted to engage the other rod thereby securing said cable grip in embracing relation with a cable or the like.

12. The invention according to claim 10 in which said elongated rods have eyes formed on the upper ends thereof, the eye of each rod being placed in embracing relation to the upper loop of its series so that after the rods are secured together and said grip is subject to strain, the other loops may move along the rods to compensate such strain.

JOSEPH DI PALMA.

REFERENCES CITED

The following references are of record in the file of this patent:

UNITED STATES PATENTS

| Number | Name | Date |
|---|---|---|
| 1,638,704 | Pope | Aug. 9, 1927 |
| 1,686,250 | Page | Oct. 2, 1928 |
| 1,851,153 | Buehring | Mar. 29, 1932 |